(12) United States Patent
Dong (10) Patent No.: US 10,601,540 B2
(45) Date of Patent: Mar. 24, 2020

(54) COMMUNICATION METHOD AND COMMUNICATION DEVICE

(71) Applicant: MEIZU TECHNOLOGY CO., LTD., Zhuhai (CN)

(72) Inventor: Xiandong Dong, Zhuhai (CN)

(73) Assignee: MEIZU TECHNOLOGY CO., LTD., Zhuhai (CN)

(*) Notice: Subject to any disclaimer, the term of this patent is extended or adjusted under 35 U.S.C. 154(b) by 41 days.

(21) Appl. No.: 15/854,694

(22) Filed: Dec. 26, 2017

(65) Prior Publication Data

US 2018/0123728 A1 May 3, 2018

Related U.S. Application Data

(63) Continuation of application No. PCT/CN2016/083708, filed on May 27, 2016.

(30) Foreign Application Priority Data

Jun. 29, 2015 (CN) .......................... 2015 1 0374401

(51) Int. Cl.
*H04L 1/00* (2006.01)
*H04B 7/0456* (2017.01)
(Continued)

(52) U.S. Cl.
CPC ......... *H04L 1/0003* (2013.01); *H04B 7/0456* (2013.01); *H04B 7/0645* (2013.01);
(Continued)

(58) Field of Classification Search
None
See application file for complete search history.

(56) References Cited

U.S. PATENT DOCUMENTS 5,724,544 A * 3/1998 Nishi .................. G06Q 20/341
                                                                                            235/492
5,740,373 A * 4/1998 Isaka ..................... H04L 12/403
                                                                                            370/389
(Continued)

FOREIGN PATENT DOCUMENTS

CN        101133613 A     2/2008
CN        101621841 A     1/2010
(Continued)

OTHER PUBLICATIONS

International Search Report for International Application No. PCT/CN2016/083708, Applicant: Shenzhen Goodix Technology Co., Ltd., dated Jul. 26, 2016, 4 pages.

(Continued)

*Primary Examiner* — Ayaz R Sheikh
*Assistant Examiner* — Tarell A Hampton (57) ABSTRACT

The present disclosure discloses a communication method in a wireless local area network and a communication device. The method includes: generating a message frame, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and transmitting the message frame to a station. The embodiments of the present disclosure provide feasible implementation manners for a combination of the multiple-input multiple-output technology (English: Multiple-Input Multiple-Output, MIMO for short) and the orthogonal frequency division multiple access technology (English: Orthogonal Frequency Division Multiple Access, OFDMA (Continued)

| First antenna information | Sub-channel information D1 | MCS1 | MCS2 | Second antenna information | Sub-channel information D2 | MCS3 | MCS4 | MCS5 | MCS6 |
|---|---|---|---|---|---|---|---|---|---| for short), which can improve spectrum utilization and improve regional throughput.

16 Claims, 4 Drawing Sheets

(51) Int. Cl.
 *H04B 7/06* (2006.01)
 *H04W 72/04* (2009.01)
(52) U.S. Cl.
 CPC .............. *H04L 1/00* (2013.01); *H04B 7/0658* (2013.01); *H04B 7/0665* (2013.01); *H04W 72/0406* (2013.01)

(56) References Cited

U.S. PATENT DOCUMENTS

| | | | | |
|---|---|---|---|---|
| 7,751,352 | B2* | 7/2010 | Seo | H04B 7/0413 |
| | | | | 370/208 |
| 7,978,724 | B1* | 7/2011 | Mansour | H04L 5/0046 |
| | | | | 370/436 |
| 9,510,335 | B2* | 11/2016 | Ko | H04L 1/0061 |
| 2006/0153227 | A1 | 7/2006 | Hwang et al. | |
| 2007/0183380 | A1* | 8/2007 | Rensburg | H04B 7/0452 |
| | | | | 370/338 |
| 2007/0183533 | A1* | 8/2007 | Schmidl | H04L 1/0003 |
| | | | | 375/299 |
| 2010/0004017 | A1 | 1/2010 | Kikuchi | |
| 2010/0054144 | A1* | 3/2010 | Choi | H04L 1/0003 |
| | | | | 370/252 |
| 2010/0103835 | A1* | 4/2010 | Sung | H04L 5/0037 |
| | | | | 370/252 |
| 2010/0208680 | A1* | 8/2010 | Nam | H04L 1/0029 |
| | | | | 370/329 |
| 2010/0215109 | A1* | 8/2010 | Onggosanusi | H04L 1/06 |
| | | | | 375/260 |
| 2010/0220679 | A1* | 9/2010 | Abraham | H04W 74/06 |
| | | | | 370/329 |
| 2010/0246705 | A1* | 9/2010 | Shin | H04W 52/146 |
| | | | | 375/267 |
| 2010/0271988 | A1* | 10/2010 | Jia | H04J 11/004 |
| | | | | 370/280 |
| 2010/0309995 | A1* | 12/2010 | Layec | H04B 7/0417 |
| | | | | 375/260 |
| 2011/0237283 | A1 | 9/2011 | Shan et al. | |
| 2012/0086599 | A1* | 4/2012 | Mo | G01S 19/11 |
| | | | | 342/357.31 |
| 2012/0314678 | A1* | 12/2012 | Ko | H04L 5/0053 |
| | | | | 370/329 |
| 2012/0327871 | A1* | 12/2012 | Ghosh | H04L 5/0023 |
| | | | | 370/329 |
| 2013/0028129 | A1* | 1/2013 | Chun | H04B 7/024 |
| | | | | 370/252 |
| 2013/0028203 | A1* | 1/2013 | Hooli | H04L 1/0026 |
| | | | | 370/329 |
| 2013/0208705 | A1 | 8/2013 | Ko et al. | |
| 2013/0229996 | A1* | 9/2013 | Wang | H04W 72/0413 |
| | | | | 370/329 |
| 2014/0241287 | A1 | 8/2014 | Cheng et al. | |
| 2015/0156753 | A1 | 6/2015 | Shan et al. | |
| 2015/0295676 | A1 | 10/2015 | Kenney et al. | |
| 2016/0021651 | A1 | 1/2016 | Ko et al. | |
| 2016/0330755 | A1* | 11/2016 | Ding | H04W 52/0216 |
| 2017/0085410 | A1* | 3/2017 | Lin | H04L 1/003 |
| 2018/0092092 | A1* | 3/2018 | Cariou | H04W 72/0453 |
| 2018/0332540 | A1* | 11/2018 | Lou | H04W 52/10 |

FOREIGN PATENT DOCUMENTS

| | | |
|---|---|---|
| CN | 102739342 A | 10/2012 |
| CN | 102859896 A | 1/2013 |
| CN | 104363192 A | 2/2015 |
| CN | 105099621 A | 11/2015 |
| JP | 2010016670 A | 1/2010 |
| KR | 20060082434 A | 7/2006 |
| WO | 2013/022468 A1 | 2/2013 |

OTHER PUBLICATIONS

Search Report for CN Application No. 201510374401.8, Applicant: Shenzhen Goodix Technology Co., Ltd., dated Dec. 7, 2017, 2 pages.

* cited by examiner

| Antenna information | MCS1 | MCS2 | MCS3 | MCS4 |
|---|---|---|---|---|

FIG. 3

| Antenna information | Sub-channel information | MCS1 | MCS2 | MCS3 | MCS4 |
|---|---|---|---|---|---|

FIG. 4

| Antenna information | Sub-channel information | MCS1 | MCS2 |
|---|---|---|---|

FIG. 5

| Antenna information | Sub-channel information D1 | MCS1 | MCS2 | Sub-channel information D2 | MCS3 | MCS4 | MCS5 |
|---|---|---|---|---|---|---|---|

FIG. 6

| First antenna information | MCS1 | MCS2 | Second antenna information | MCS3 | MCS4 | MCS5 | MCS6 |

FIG. 7

| First antenna information | Sub-channel information D1 | MCS1 | MCS2 | Second antenna information | Sub-channel information D2 | MCS3 | MCS4 | MCS5 | MCS6 |

FIG. 8

| Length information | First antenna information | Sub-channel information D1 | MCS1 | MCS2 | Second antenna information | Sub-channel information D2 | MCS3 | MCS4 | MCS5 | MCS6 |

COMMUNICATION METHOD AND COMMUNICATION DEVICE

CROSS-REFERENCE TO RELATED APPLICATIONS

This application is a continuation of International Application No. PCT/CN2016/083708, filed on May 27, 2016, which claims priority to Chinese Patent Application No. 201510374401.8, filed on Jun. 29, 2015. Both of the aforementioned applications are hereby incorporated by reference in their entireties.

TECHNICAL FIELD

The present disclosure relates to the field of communications, and in particular, to a communication method in a wireless local area network and a communication device.

BACKGROUND

The next generation wireless-fidelity (English: Wireless-Fidelity, Wi-Fi for short) technology is also referred to as the High Efficiency WLAN (English: High efficiency WLAN, HEW for short) technology, and a vision proposed by HEW is: to achieve higher regional throughput and be applicable to a more intensive communication environment in comparison with the existing Wi-Fi technology; and to improve an effective utilization efficiency of a spectrum and improve quality of experience (English: Quality of Experience, QoE for short).

Therefore, there is a need for a method that can improve spectrum utilization in wireless communication and improve regional throughput to apply to a vision proposed by 802.11ax.

SUMMARY

Embodiments of the present disclosure provide a communication method in a wireless local area network and a communication device, which can improve spectrum utilization in wireless communication and improve regional throughput.

According to a first aspect, a communication method in a wireless local area network is provided, including: generating a message frame, where the message frame includes an antenna information field of each of a plurality of antennas and a plurality of Modulation and Coding Scheme MCS fields corresponding to each antenna, where each of the plurality of MCS fields is used to indicate an MCS, and an antenna information field of each antenna is used to indicate identification information of the antenna; and transmitting the message frame to a station.

According to a second aspect, a communication device is provided, including: a generating unit, where the generating unit is configured to generate a message frame, and the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and a transmitting unit, where the transmitting unit is configured to transmit the message frame to a station.

According to a third aspect, a communication method in a wireless local area network is provided, including: receiving a message frame transmitted from a communication device, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and performing decoding according to the message frame.

According to a fourth aspect, a communication device is provided, including: a receiving unit, where the receiving unit is configured to receive a message frame, and the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and a decoding unit, where the decoding unit is configured to perform decoding according to the message frame. Therefore, the embodiments of the present disclosure provide feasible implementation manners for a combination of the multiple-input multiple-output technology (English: Multiple-Input Multiple-Output, MIMO for short) and the orthogonal frequency division multiple access technology (English: Orthogonal Frequency Division Multiple Access, OFDMA for short), which can improve spectrum utilization and improve regional throughput.

BRIEF DESCRIPTION OF DRAWINGS

To illustrate the technical solution of embodiments of the present disclosure more clearly, the accompanying drawings which are needed in the embodiments of the present disclosure are introduced briefly below, and apparently, the accompanying drawings described below are merely some of the embodiments of the present disclosure, based on which other drawings can be obtained by those of ordinary skill in the art without any creative effort.

DESCRIPTION OF EMBODIMENTS

The technical solution in the embodiments of the present disclosure will be described clearly and fully below in conjunction with the drawings in the embodiments of the present disclosure, and apparently, the embodiments described are only part of embodiments of the present disclosure, not all of them. All of other embodiments, obtained by those of ordinary skill in the art based on the embodiments of the present disclosure without any creative effort, fall into the protection scope of the present disclosure.

Figure 1:
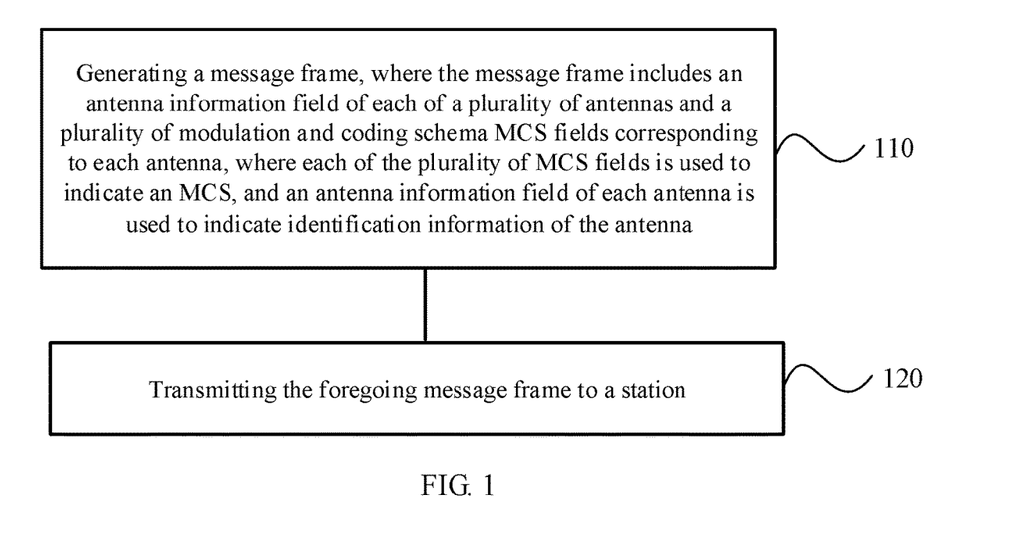
FIG. 1 illustrates a method of communication in a wireless local area network according to an embodiment of the present disclosure.

FIG. 1 a method of communication in a wireless local area network according to an embodiment of the present disclosure, and an execution subject of the method may be a wireless access point AP. As shown in FIG. 1, the method 100 includes the following steps:

110, generating a message frame, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and

120, transmitting the foregoing message frame to a station.

In step 110, a plurality of antennas refer to no less than two antennas, the foregoing message frame includes an antenna information field of each of the plurality of antennas, and an antenna information field of each antenna is used to indicate identification information of the antenna; specifically, each of the plurality of antennas may be numbered, and then the antenna information field of each antenna carries number information of each corresponding antenna.

Optionally, in step 110, each antenna information field may be represented by three bits, for example, a first antenna may be denoted by 000; and it should be understood that the antenna information field of each antenna may also occupy another number of bits, and the present disclosure is not limited hereto.

Further, in step 110, the message frame includes the plurality of MCS fields corresponding to each antenna; specifically, each channel may further be divided into a plurality of sub-channels when each antenna occupies a certain channel bandwidth, and each sub-channel adopts an MCS; it should be noted that MCSs adopted by the plurality of sub-channels may be the same or different, and the plurality of MCS fields corresponding to each antenna are used to carry the MCSs adopted by the plurality of sub-channels. For example, when a 20 MHz channel occupied by a first antenna is divided into four 5 MHz sub-channels respectively, each of the four sub-channels of the first antenna adopts an MCS, for example, a first sub-channel and a third sub-channel adopt a BPSK modulation manner, a second sub-channel and a fourth sub-channel adopt a QPSK modulation manner, and then four MCS fields corresponding to the first antenna are respectively used to carry MCSs of the four sub-channels. It should be understood that the foregoing numerical values are merely exemplary, and the present disclosure is not limited hereto.

Therefore, the embodiment of the present disclosure provides a feasible implementation manner for a combination of the multiple-input multiple-output technology (English: Multiple-Input Multiple-Output, MIMO for short) and the orthogonal frequency division multiple access technology (English: Orthogonal Frequency Division Multiple Access, OFDMA for short), which can improve spectrum utilization and improve regional throughput.

Optionally, as an embodiment of the present disclosure, the foregoing message frame further includes at least one sub-channel information filed corresponding to each antenna, where each of the at least one sub-channel information field is used to indicate a bandwidth of the sub-channel, and each sub-channel bandwidth corresponds to a plurality of MCS fields.

Specifically, a sub-channel information field of an antenna is used to indicate a sub-channel bandwidth of the antenna, which is sub-channel bandwidth granularity for dividing a full channel bandwidth by the antenna, and the field may occupy two bits to represent the sub-channel bandwidth of the antenna. For example, if a channel bandwidth of the antenna is 20 MHz, when a sub-channel bandwidth of the antenna is 5 MHz, a sub-channel information field of the antenna may be denoted by 00, and the antenna may correspond to four sub-channels having 5 MHz bandwidth respectively; and when a sub-channel bandwidth of the antenna is 10 MHz, a sub-channel information field of the antenna may be denoted by 01, and then the antenna may correspond to two sub-channels having 10 MHz bandwidth respectively; and it should be understood that a channel occupied by each antenna may be divided according to any one of sub-channel bandwidths that can be implemented, such as 2.5 MHz and 5 MHz, and the present disclosure is not limited hereto.

Further, one sub-channel information field may correspond to a plurality of MCS fields; if an antenna occupying a 20 MHz channel bandwidth only has a sub-channel information field and a sub-channel bandwidth carried by the sub-channel information field is 5 MHz, four subdomains contiguous to the sub-channel information respectively indicate MCSs adopted by four sub-channels of the antenna, that is, one sub-channel information field corresponds to four MCS fields; if the antenna occupying a 20 MHz channel bandwidth has two sub-channel information fields D1 and D2 and a sub-channel bandwidth carried by the D1 field is 5 MHz, followed by the D1 field, two MCS fields contiguous to bits occupied by the D1 field represent that there are two sub-channels having 5 MHz granularity respectively in the antenna and each sub-channel corresponds to an MCS, and a sub-channel bandwidth carried by the D2 field is 2.5 MHz, followed by the D2 field, four MCS fields contiguous to bits occupied by the D2 field represent that there are four sub-channels having 2.5 MHz granularity respectively in the antenna and each sub-channel corresponds to an MCS.

Optionally, as an embodiment of the present disclosure, each MCS field occupies four bits to represent an MCS, for example, MCS5 may be denoted by 0101; and it should be understood that an MCS may also be represented by another number of bits, and the present disclosure is not limited hereto.

Optionally, as an embodiment of the present disclosure, bits occupied by each sub-channel information field and bits occupied by a plurality of MCS fields corresponding to the sub-channel are consecutive.

Preferably, bits occupied by an antenna information field of each antenna, bits occupied by a sub-channel information field of the each antenna and bits occupied by a plurality of MCS fields corresponding to each sub-channel information fields are consecutive, where the bits occupied by the plurality of MCS fields are consecutive. It should be understood that the order of the antenna information field of each antenna, the sub-channel information field of the each antenna and the plurality of MCS fields corresponding to each sub-channel information field is not limited.

Optionally, as an embodiment of the present disclosure, an antenna information filed of each of a plurality of antennas, a plurality of MCS fields corresponding to each antenna and at least one sub-channel information field corresponding to the each antenna constitute a signaling field B SIG-B.

That is, the foregoing message frame may have an improved frame structure of the signaling field B; it should be understood that a signaling field constituted by the antenna information filed of the each antenna, the plurality of MCS fields corresponding to the each antenna and the at least one sub-channel information field corresponding to the each antenna may also be an independent message frame, and the present disclosure is not limited hereto.

Optionally, as an embodiment of the present disclosure, the foregoing frame further includes a length information field, and the length information field is used to indicate the number of bits occupied by the message frame.

Therefore, the embodiments of the present disclosure provide feasible implementation manners for a combination of the multiple-input multiple-output technology (English: Multiple-Input Multiple-Output, MIMO for short) and the orthogonal frequency division multiple access technology (English: Orthogonal Frequency Division Multiple Access, OFDMA for short), which can improve spectrum utilization and improve regional throughput.

Figure 2:
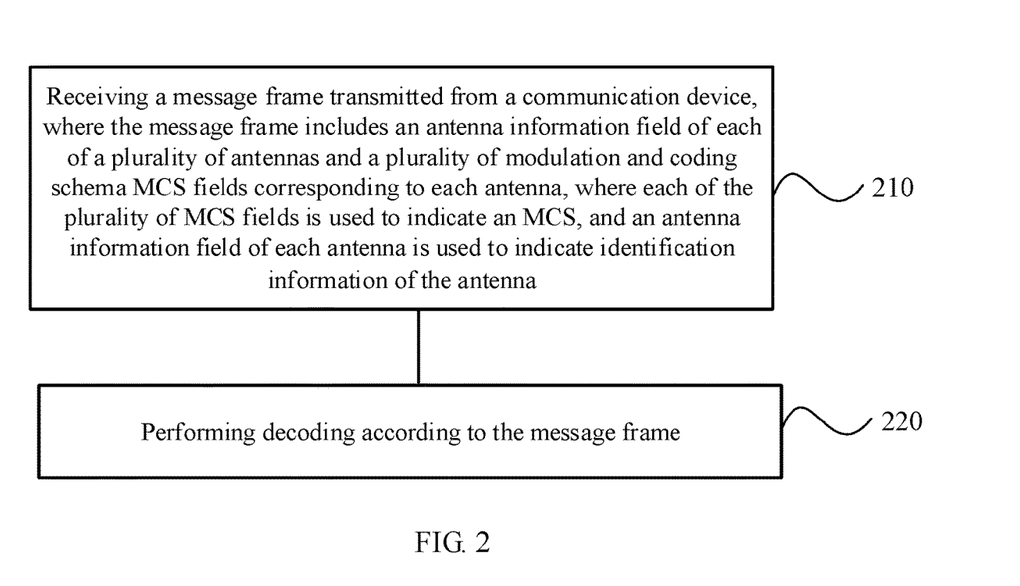
FIG. 2 illustrates a method of communication in a wireless local area network according to another embodiment of the present disclosure.

FIG. 2 a method of communication in a wireless local area network according to another embodiment of the present disclosure, an execution subject of the method may be a station STA, and a STA will be taken as an example for illustration in the following description. As shown in FIG. 2, the method 200 includes the following steps:

210, receiving a message frame transmitted from a communication device, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and 220, performing decoding according to the message frame.

Specifically, in step 220, a STA obtains the identification information of the antenna according to a group number and a position within the group allocated by an AP to the station in an association process, and further, the STA determines an MCS required for decoding by the station according to the identification information of the antenna corresponding to the STA and relative positions of a plurality of MCS fields corresponding to the antenna.

Therefore, the embodiment of the present disclosure provides a feasible implementation manner for a combination of the MIMO technology and the OFDMA technology, which can improve spectrum utilization and improve regional throughput.

Optionally, as an embodiment of the present disclosure, the foregoing message frame further includes at least one sub-channel information filed corresponding to each antenna, where each of the at least one sub-channel information field is used to indicate a bandwidth of the sub-channel, and each sub-channel bandwidth corresponds to a plurality of MCS fields.

Specifically, a STA performs decoding according to identification information of an antenna corresponding to the STA, a sub-channel bandwidth corresponding to the antenna and a plurality of MCS fields corresponding to the sub-channel bandwidth.

Optionally, as an embodiment of the present disclosure, bits occupied by each sub-channel information field and bits occupied by a plurality of MCS fields corresponding to the sub-channel are consecutive.

Optionally, as an embodiment of the present disclosure, an antenna information filed of each of a plurality of antennas, a plurality of MCS fields corresponding to each antenna and at least one sub-channel information field corresponding to the each antenna constitute a signaling field B SIG-B.

Therefore, the embodiments of the present disclosure provide feasible implementation manners for a combination of the MIMO technology and the OFDMA technology, which can improve spectrum utilization and improve regional throughput.

Figure 3:
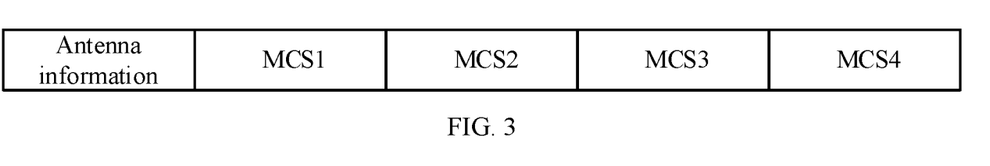
FIG. 3 is a schematic diagram of a frame structure of a message frame according to an embodiment of the present disclosure.

FIG. 3 is a schematic diagram of a frame structure of a message frame according to an embodiment of the present disclosure.

In 802.11ax, it is possible to adopt the multi-antenna technology to improve space utilization, thereby improving throughput of an entire area; therefore, in a multi-user scenario, a message frame is required to add antenna information. As shown in FIG. 3, a message frame of an embodiment of the present disclosure includes antenna information, and the antenna information may occupy three bits, for example, 000 denotes an identification ID of a first antenna; and the antenna information may also occupy another number of bits, and the present disclosure is not limited hereto.

As described in FIG. 3, four consecutive fields followed by the antenna information respectively represent four MCS fields, representing four MCS fields correspond to the antenna, which are MCS1, MCS2, MCS3 and MCS4, respectively; each of the four fields carries an MCS, each MCS field may adopt four or another number of bits to represent an MCS manner, and the MCS manners represented by the four consecutive fields may be the same or different. It should be understood that the foregoing numerical values are merely exemplary, and the present disclosure is not limited hereto; and other numerical values that can implement the foregoing technical solution shall also fall into the protection scope of the present disclosure.

When the multi-antenna technology is adopted for communication, each of a plurality of antennas needs to correspond to an antenna information field and a plurality of MCS fields; FIG. 3 merely shows an example of an antenna for illustration; and the message frame further includes antenna information fields and MCS fields of other antennas, and the present disclosure is not limited hereto.

Therefore, the embodiment of the present disclosure provides a feasible implementation manner for a combination of the MIMO technology and the OFDMA technology, which can improve spectrum utilization and improve regional throughput.

Figure 4:
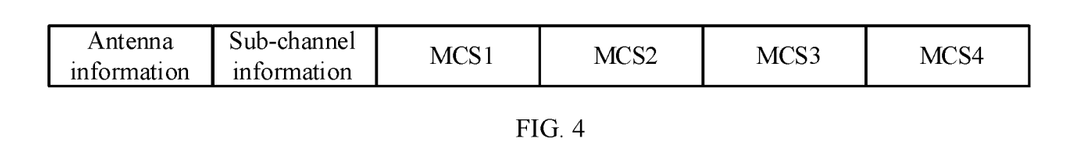
FIG. 4 is a schematic diagram of a frame structure of a message frame according to another embodiment of the present disclosure.

FIG. 4 is a schematic diagram of a frame structure of a message frame according to another embodiment of the present disclosure.

As shown in FIG. 4, the message frame includes an antenna information field, a sub-channel information field and four MCS fields in sequence, and the four MCS fields are: MCS1, MCS2, MCS3 and MCS4; and if the antenna information field carries an identification of a first antenna, the sub-channel information field adjacent to the antenna information field carries a sub-channel bandwidth allocated by the first antenna to a station. When a bandwidth of the first antenna is 20 MHz and sub-channel information is 5 MHz, for the channel information field, the sub-channel information may be represented by 2 bits, for example, the 5 MHz sub-channel bandwidth is denoted by 00; and when sub-channel information is 10 MHz, the 10 MHz sub-channel bandwidth is denoted by 01, and the present disclosure is not limited hereto.

It should be understood that the foregoing numerical values are merely exemplary, and the present disclosure is not limited hereto; and other numerical values that can implement the foregoing technical solution shall also fall into the protection scope of the present disclosure.

When a plurality of antennas are adopted, each antenna corresponds to an antenna information field and a plurality of MCS fields; FIG. 4 merely shows an example of an antenna for illustration; and the message frame further includes antenna information fields, sub-channel information fields and MCS fields of other antennas, and the present disclosure is not limited hereto.

Therefore, the embodiment of the present disclosure provides a feasible implementation manner for a combination of the MIMO technology and the OFDMA technology, which can improve spectrum utilization and improve regional throughput.

Figure 5:
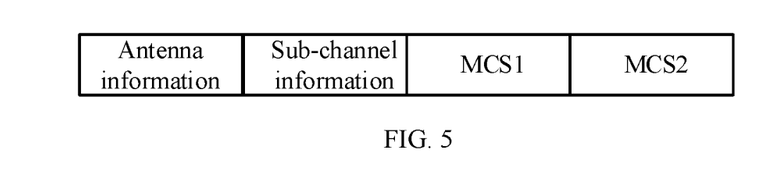
FIG. 5 is a schematic diagram of a frame structure of a message frame according to another embodiment of the present disclosure.

FIG. 5 is a schematic diagram of a frame structure of a message frame according to another embodiment of the present disclosure.

As shown in FIG. 5, the message frame includes an antenna information field, a sub-channel information field and two MCS fields in sequence, and the two MCS fields are: MCS1 and MCS2; and if the antenna information field carries an identification of a first antenna, the sub-channel information field adjacent to the antenna information field carries a sub-channel bandwidth allocated by the first antenna to each station. Each of the two MCS fields contiguous to the sub-channel information field carries an MCS allocated by the first antenna to the station.

It should be understood that the foregoing numerical values are merely exemplary, and the present disclosure is not limited hereto; and numerical values that can implement the foregoing technical solution shall also fall into the protection scope of the present disclosure.

When a plurality of antennas are adopted, each antenna corresponds to an antenna information field and a plurality of MCS fields; FIG. 5 merely shows an example of an antenna for illustration; and the message frame further includes antenna information fields, sub-channel information fields and MCS fields of other antennas, and the present disclosure is not limited hereto.

Therefore, the embodiment of the present disclosure provides a feasible implementation manner for a combination of the MIMO technology and the OFDMA technology, which can improve spectrum utilization and improve regional throughput.

Figure 6:
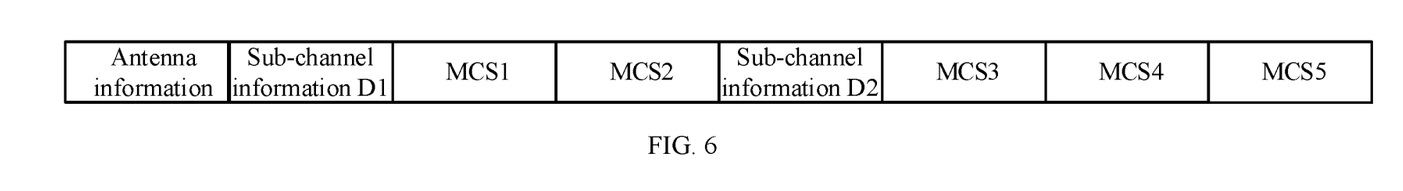
FIG. 6 is a schematic diagram of a frame structure of a message frame according to another embodiment of the present disclosure.

FIG. 6 is a schematic diagram of a frame structure of a message frame according to another embodiment of the present disclosure.

As shown in FIG. 6, the message frame includes an antenna information field, a sub-channel information D1 field, an MCS1 field, an MCS2 field, a sub-channel information D2 field, an MCS3 field, an MCS4 field and an MCS5 field in sequence; if the antenna information field carries an identification of a first antenna, the sub-channel information D1 field adjacent to the antenna information field carries a first sub-channel bandwidth allocated by the first antenna to a station, and each of the two MCS fields contiguous to the sub-channel information D1 field carries an MCS allocated by the first antenna to the station; and the sub-channel information D2 field adjacent to the MSC2 field carries a second sub-channel bandwidth allocated by the first antenna to the station, and the MCS3 field, the MCS4 field and the MCS5 field contiguous to the sub-channel information D2 field carry MCSs, respectively.

Specifically, for example, assuming that for the antenna information, the first antenna is represented by a bit of 000, a channel bandwidth occupied by the first antenna is 40 MHz, and for the sub-channel information D1 field, a 5 MHz sub-channel bandwidth is represented by a bit of 00, MCS1 and MCS2 respectively represent MCSs corresponding to two 5 MHz sub-channel bandwidths, that is, MCSs are allocated to a station occupying the 10 MHz bandwidth; further, assuming that for the sub-channel information D2 field, a 10 MHz sub-channel bandwidth is identified by a bit of 01, MCS3, MCS4 and MCS5 respectively represent MCSs adopted on three 10 MHz sub-channel bandwidths, that is, MCSs are allocated to a station occupying the 30 MHz bandwidth.

It should be understood that the foregoing numerical values are merely exemplary, and the present disclosure is not limited hereto; and other numerical values that can implement the foregoing technical solution shall also fall into the protection scope of the present disclosure.

When a plurality of antennas are adopted, each antenna corresponds to an antenna information field and a plurality of MCS fields; FIG. 6 merely shows an example of an antenna for illustration; and the message frame further includes antenna information fields, sub-channel information fields and MCS fields of other antennas, and the present disclosure is not limited hereto.

Therefore, the embodiment of the present disclosure provides a feasible implementation manner for a combination of the MIMO technology and the OFDMA technology, which can improve spectrum utilization and improve regional throughput.

Figure 7:
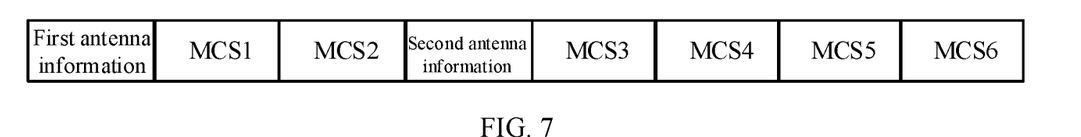
FIG. 7 is a schematic diagram of a frame structure of a message frame according to another embodiment of the present disclosure.

FIG. 7 is a schematic diagram of a frame structure of a message frame according to another embodiment of the present disclosure.

As described in FIG. 7, two antennas are taken as examples for illustration; the two antennas are a first antenna and a second antenna, respectively; therefore, the message frame includes a first antenna information field, an MCS1 field and an MCS2 field corresponding to the first antenna, a second antenna information field, and an MCS3 field, an MCS4 field, an MCS5 field and an MCS6 field corresponding to the second antenna in sequence.

Therefore, the embodiment of the present disclosure provides a feasible implementation manner for a combination of the MIMO technology and the OFDMA technology, which can improve spectrum utilization and improve regional throughput.

Figure 8:
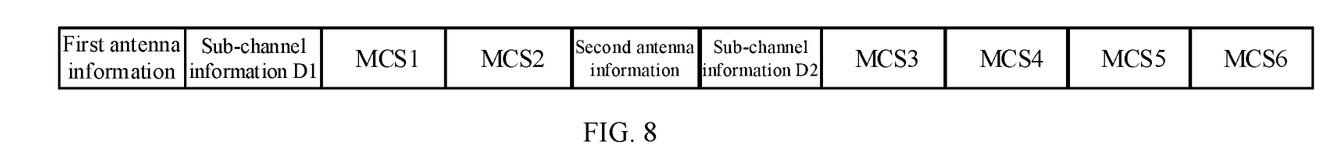
FIG. 8 is a schematic diagram of a frame structure of a message frame according to another embodiment of the present disclosure.

FIG. 8 is a schematic diagram of a frame structure of a message frame according to another embodiment of the present disclosure.

As described in FIG. 8, two antennas are taken as examples for illustration; the two antennas are a first antenna and a second antenna, respectively; and the message frame includes a first antenna information field, a sub-channel information D1 field, an MCS1 field and an MCS2 field corresponding to the first antenna, second antenna information, a sub-channel information D2 field, and an MCS3 field, an MCS4 field, an MCS5 field and an MCS6 field corresponding to the second antenna in sequence.

Therefore, the embodiment of the present disclosure provides a feasible implementation manner for a combination of the MIMO technology and the OFDMA technology, which can improve spectrum utilization and improve regional throughput.

Figure 9:
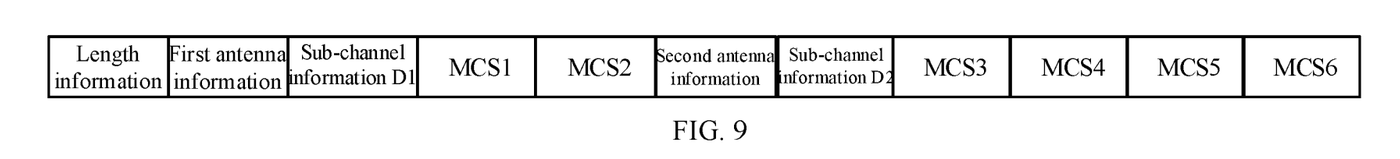
FIG. 9 is a schematic diagram of a frame structure of a message frame according to another embodiment of the present disclosure.

FIG. 9 is a schematic diagram of a frame structure of a message frame according to another embodiment of the present disclosure.

As described in FIG. 9, two antennas are taken as examples for illustration; the two antennas are a first antenna and a second antenna, respectively; and the message frame includes length information, a first antenna information field, a sub-channel information D1 field, an MCS1 field and an MCS2 field corresponding to the first antenna, second antenna information, a sub-channel information D2 field, and an MCS3 field, an MCS4 field, an MCS5 field and an MCS6 field corresponding to the second antenna in sequence. The length information field of the message frame carries a number of bits occupied by the full message frame, which is a length of the message frame.

Therefore, the embodiment of the present disclosure provides a feasible implementation manner for a combination of the MIMO technology and the OFDMA technology, which can improve spectrum utilization and improve regional throughput.

A method of communication in a wireless local area network in the embodiments of the present disclosure has been described above in detail in combination with FIG. 1 to FIG. 9, and a communication device according to the embodiments of the present disclosure will be described below in detail in combination with FIG. 10 and FIG. 11.

Figure 10:
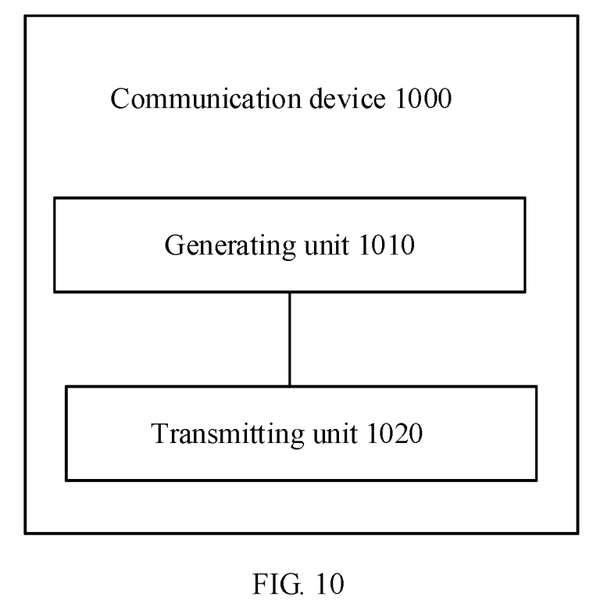
FIG. 10 is a schematic block diagram of a communication device according to an embodiment of the present disclosure.

FIG. 10 is a schematic block diagram of a communication device according to an embodiment of the present disclosure. It should be understood that a communication device 1000 according to the embodiments of the present disclosure may correspond to an execution subject of a communication method in a wireless local area network in the embodiments of the present disclosure, moreover, the foregoing and other operations and/or functions of modules in the communication device 1000 are respectively used for achieving corresponding procedures of methods in FIG. 1, and for concision, they will not be repeated redundantly herein. As shown in FIG. 10, the communication device 1000 includes: a generating unit 1010, configured to generate a message frame, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and a transmitting unit 1020, configured to transmit the message frame to a station.

Optionally, as an embodiment of the present disclosure, the message frame further includes at least one sub-channel information filed corresponding to each antenna, where each of the at least one sub-channel information field is used to indicate a bandwidth of the sub-channel, and each sub-channel bandwidth corresponds to a plurality of MCS fields.

Optionally, as an embodiment of the present disclosure, bits occupied by each sub-channel information field and bits occupied by a plurality of MCS fields corresponding to the sub-channel are consecutive.

Optionally, as an embodiment of the present disclosure, an antenna information filed of each antenna, a plurality of MCS fields corresponding to each antenna and at least one sub-channel information field corresponding to each antenna constitute a signaling field B SIG-B.

Therefore, the embodiments of the present disclosure provide feasible implementation manners for a combination of the MIMO technology and the OFDMA technology, which can improve spectrum utilization and improve regional throughput.

Figure 11:
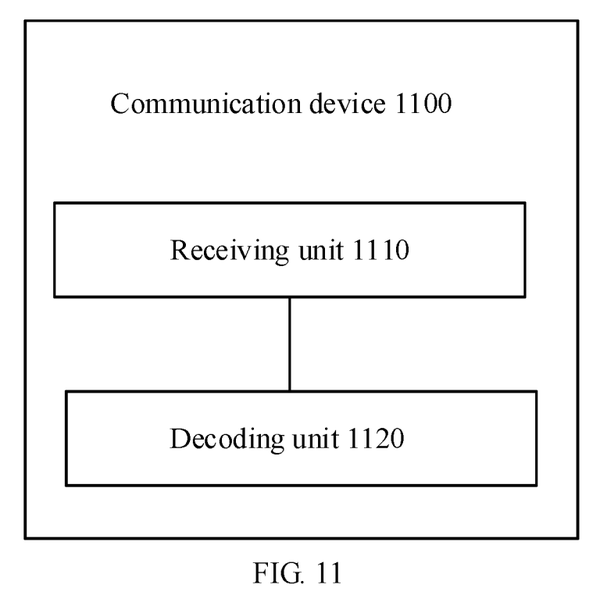
FIG. 11 is a schematic block diagram of a communication device according to another embodiment of the present disclosure.

FIG. 11 is a schematic block diagram of a communication device according to an embodiment of the present disclosure. It should be understood that a communication device 1110 according to the embodiments of the present disclosure may correspond to an execution subject of a communication method in a wireless local area network in the embodiments of the present disclosure, moreover, the foregoing and other operations and/or functions of modules in the communication device 1100 are respectively used for achieving corresponding procedures of methods in FIG. 2, and for concision, they will not be repeated redundantly herein. As shown in FIG. 11, the communication device 1100 includes: a receiving unit 1110, configured to receive a message frame, where the message frame includes an antenna information field of each of a plurality of antennas and a plurality of Modulation and Coding Schema MCS fields corresponding to each antenna, where each of the plurality of MCS fields is used to indicate an MCS, and an antenna information field of each antenna is used to indicate identification information of the antenna; and a decoding unit 1120, configured to perform decoding according to the message frame.

Optionally, as an embodiment of the present disclosure, the message frame further includes at least one sub-channel information filed corresponding to each antenna, where each of the at least one sub-channel information field is used to indicate a bandwidth of the sub-channel, and each sub-channel bandwidth corresponds to a plurality of MCS fields.

Optionally, as an embodiment of the present disclosure, bits occupied by each sub-channel information field and bits occupied by a plurality of MCS fields corresponding to the sub-channel are consecutive.

Optionally, as an embodiment of the present disclosure, an antenna information filed of each antenna, a plurality of MCS fields corresponding to each antenna and at least one sub-channel information field corresponding to each antenna constitute a signaling field B SIG-B.

Therefore, the embodiments of the present disclosure provide feasible implementation manners for a combination of the MIMO technology and the OFDMA technology, which can improve spectrum utilization and improve regional throughput.

Those of ordinary skill in the art may realize that, units and algorithm steps in conjunction with the various examples described by the embodiments disclosed herein can be realized by electronic hardware, computer software or the combination thereof, and in order to clearly describe the interchangeability of hardware and software, the compositions and steps of the various examples are generally described according to functions in the foregoing description. Whether these functions are executed in hardware or software mode depends on the specific applications and design constraint conditions of the technical solution. Those skilled may implement the described functions by using different methods for each specific application, but this implementation should not be considered to be beyond the scope of the present disclosure.

Those skilled in the art to which the present disclosure pertains may clearly understand that, for the convenience and simplicity of description, for the specific working processes of the system, the apparatus and the units described above, may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. In addition, the displayed or discussed mutual coupling or direct coupling or communication connection may be indirect coupling or communication connection via some interfaces, apparatuses or units, and may also be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the embodiments of the present disclosure according to actual demands.

In addition, the respective functional units in the respective embodiments of the present disclosure may be integrated in one processing unit, or the respective units singly exist physically, or two or more units are integrated in one unit. The foregoing integrated unit may be implemented in the form of hardware, or be implemented in a form of a software functional unit.

If the integrated unit is implemented in the form of the software functional unit and is sold or used as an independent product, it may be stored in a computer readable storage medium. Based on such understanding, the technical solution of the present disclosure substantially, or the part of the present disclosure making contribution to the prior art, or all of or part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present disclosure. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

Described above is the specific embodiments of the present disclosure only, but the protection scope of the present disclosure is not limited to this, any skilled one who is familiar with this art could readily think of various equivalent modifications or substitutions within the disclosed technical scope of the present disclosure, and these modifications or substitutions shall fall within the protection scope of the present disclosure. Therefore, the protection scope of the present disclosure shall be defined by the claims.

What is claimed is:

1. A communication method in a wireless local area network, comprising:
   generating a message frame, wherein the message frame comprises an antenna information field of each of a plurality of antennas and a plurality of Modulation and Coding Schema (MCS) fields corresponding to each antenna, wherein each of the plurality of MCS fields is used to indicate an MCS, a channel bandwidth occupied by the each antenna comprises a plurality of sub-channels, the plurality of MCS fields are used to carry the MCSs adopted by the plurality of sub-channels, an antenna information field of each antenna is used to indicate identification information of the antenna, the message frame further comprises at least one sub-channel information field corresponding to each antenna, each of the at least one sub-channel information field is used to indicate a bandwidth of the sub-channel, and each sub-channel field corresponds to a plurality of MCS fields; and
   transmitting the message frame to a station.

2. The method according to claim 1, wherein bits occupied by each sub-channel information field and bits occupied by a plurality of MCS fields corresponding to the sub-channel are consecutive.

3. The method according to claim 1, wherein the antenna information field of each antenna, the plurality of MCS fields corresponding to each antenna and the at least one sub-channel information field corresponding to each antenna constitute a signaling field B SIG-B.

4. A communication device, comprising:
   a generating unit, wherein the generating unit is configured to generate a message frame, and the message frame comprises an antenna information field of each of a plurality of antennas and a plurality of Modulation and Coding Schema (MCS) fields corresponding to each antenna, wherein each of the plurality of MCS fields is used to indicate an MCS, a channel bandwidth occupied by the each antenna comprises a plurality of sub-channels, the plurality of MCS fields are used to carry the MCSs adopted by the plurality of sub-channels, an antenna information field of each antenna is used to indicate identification information of the antenna, the message frame further comprises at least one sub-channel information field corresponding to each antenna, each of the at least one sub-channel information field is used to indicate a bandwidth of the sub-channel, and each sub-channel field corresponds to a plurality of MCS fields; and
   a transmitting unit, wherein the transmitting unit is configured to transmit the message frame to a station.

5. The device according to claim 4, wherein bits occupied by each sub-channel information field and bits occupied by a plurality of MCS fields corresponding to the subchannel are consecutive.

6. The device according to claim 4, wherein the antenna information field of each antenna, the plurality of MCS fields corresponding to each antenna and the at least one sub-channel information field corresponding to each antenna constitute a signaling field B SIG-B.

7. A communication method in a wireless local area network, comprising:
   receiving a message frame transmitted from a communication device, wherein the message frame comprises an antenna information field of each of a plurality of antennas and a plurality of Modulation and Coding Schema (MCS) fields corresponding to each antenna, wherein each of the plurality of MCS fields is used to indicate an MCS, a channel bandwidth occupied by the each antenna comprises a plurality of sub-channels, the plurality of MCS fields are used to carry the MCSs adopted by the plurality of sub-channels, an antenna information field of each antenna is used to indicate identification information of the antenna, the message frame further comprises at least one sub-channel information field corresponding to each antenna, each of the at least one sub-channel information field is used to indicate a bandwidth of the sub-channel, and each sub-channel field corresponds to a plurality of MCS fields; and performing decoding according to the message frame.

8. The method according to claim 7, wherein bits occupied by each subchannel information field and bits occupied by a plurality of MCS fields corresponding to the sub-channel are consecutive.

9. The method according to claim 7, wherein the antenna information field of each antenna, the plurality of MCS fields corresponding to each antenna and the at least one sub-channel information field corresponding to each antenna constitute a signaling field B SIG-B.

10. A communication device, comprising:
a receiving unit, wherein the receiving unit is configured to receive a message frame, and the message frame comprises an antenna information field of each of a plurality of antennas and a plurality of Modulation and Coding Schema MCS fields corresponding to each antenna, wherein each of the plurality of MCS fields is used to indicate an MCS, a channel bandwidth occupied by the each antenna comprises a plurality of sub-channels, the plurality of MCS fields are used to carry the MCSs adopted by the plurality of sub-channels, an antenna information field of each antenna is used to indicate identification information of the antenna, the message frame further comprises at least one sub-channel information field corresponding to each antenna, each of the at least one sub-channel information field is used to indicate a bandwidth of the sub-channel, and each sub-channel field corresponds to a plurality of MCS fields; and
a decoding unit, wherein the decoding unit is configured to perform decoding according to the message frame.

11. The device according to claim 10, wherein bits occupied by each subchannel information field and bits occupied by a plurality of MCS fields corresponding to the sub-channel are consecutive.

12. The device according to claim 10, wherein the antenna information field of each antenna, the plurality of MCS fields corresponding to each antenna and the at least one sub-channel information field corresponding to each antenna constitute a signaling field B SIG-B.

13. The method according to claim 1, wherein one of the plurality of MCS fields is used to indicate one MCS adopted by one of the plurality of sub-channels.

14. The device according to claim 4, wherein one of the plurality of MCS fields is used to indicate one MCS adopted by one of the plurality of sub-channels.

15. The method according to claim 7, wherein one of the plurality of MCS fields is used to indicate one MCS adopted by one of the plurality of sub-channels.

16. The device according to claim 10, wherein one of the plurality of MCS fields is used to indicate one MCS adopted by one of the plurality of sub-channels.

* * * * *